US011781966B2

(12) United States Patent
Zuo et al.

(10) Patent No.: US 11,781,966 B2
(45) Date of Patent: Oct. 10, 2023

(54) 3D DIFFRACTION TOMOGRAPHY MICROSCOPY IMAGING METHOD BASED ON LED ARRAY CODED ILLUMINATION

(71) Applicant: Nanjing University of Science and Technology, Jiangsu (CN)

(72) Inventors: Chao Zuo, Nanjing (CN); Qian Chen, Nanjing (CN); Jiaji Li, Nanjing (CN); Jiasong Sun, Nanjing (CN); Yao Fan, Nanjing (CN); Shijie Feng, Nanjing (CN); Yuzhen Zhang, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 309 days.

(21) Appl. No.: 17/289,605

(22) PCT Filed: Jul. 5, 2019

(86) PCT No.: PCT/CN2019/094886
§ 371 (c)(1),
(2) Date: Apr. 28, 2021

(87) PCT Pub. No.: WO2020/087966
PCT Pub. Date: May 7, 2020

(65) Prior Publication Data
US 2021/0372916 A1    Dec. 2, 2021

(30) Foreign Application Priority Data
Nov. 1, 2018   (CN) .......................... 201811292260.5

(51) Int. Cl.
*G01N 15/14*       (2006.01)

(52) U.S. Cl.
CPC ..... *G01N 15/1434* (2013.01); *G01N 15/1468* (2013.01); *G01N 2015/145* (2013.01); *G01N 2015/1445* (2013.01)

(58) Field of Classification Search
CPC ............. G01N 15/1434; G01N 15/468; G01N 2015/145; G01N 2015/1445;
(Continued)

(56) References Cited

U.S. PATENT DOCUMENTS

| 4,594,662 A * | 6/1986 | Devaney ............. G01S 15/8977 128/916 |
| 10,082,662 B2 * | 9/2018 | Park ................... G01N 21/6458 |

(Continued)

FOREIGN PATENT DOCUMENTS

| CN | 102792151 A | 11/2012 |
| CN | 106842540 A | 6/2017 |

(Continued)

OTHER PUBLICATIONS

International Search Report, issued in PCT/CN2019/094886, dated Sep. 24, 2019.
(Continued)

*Primary Examiner* — Hoa Q Pham
(74) *Attorney, Agent, or Firm* — Birch, Stewart, Kolasch & Birch, LLP

(57) ABSTRACT

The present invention discloses a three-dimensional diffraction tomography microscopy imaging method based on LED array coded illumination. Firstly, acquiring the raw intensity images, three sets of intensity image stacks are acquired at different out-of-focus positions by moving the stage or using electrically tunable lens. And then, after acquiring the intensity image stacks of the object to be measured at different out-of-focus positions, the three-dimensional phase transfer function of the microscopy imaging system with arbitrary shape illumination is derived. Further, the three-dimensional phase transfer function of the microscopic system under circular and annular illumination with different coherence coefficients is obtained as well, and the three-dimensional quantitative refractive index is reconstructed by inverse Fourier transform of the three-dimensional scattering potential function. The scattering potential function is converted into the refractive index distribution. Thus, the quantitative three-dimensional refractive index distribution of the test object is obtained. The invention realizes high-resolution
(Continued)

and high signal-to-noise ratio 3D diffraction tomography microscopic imaging of cells, tiny biological tissues and other samples.

5 Claims, 3 Drawing Sheets

(58) Field of Classification Search
CPC .......... G01B 9/02091; G01B 9/02034; G01B 11/2441; G01B 11/254
USPC ......... 356/479, 497, 456, 601–623, 128–237
See application file for complete search history.

(56) References Cited

U.S. PATENT DOCUMENTS

| | | | |
|---|---|---|---|
| 10,665,001 B2* | 5/2020 | Horstmeyer | G02B 21/365 |
| 11,408,725 B2* | 8/2022 | Park | A61B 5/0073 |
| 11,555,992 B2* | 1/2023 | Chen | G02B 21/361 |
| 2010/0135547 A1 | 6/2010 | Lee et al. | |
| 2018/0231761 A1* | 8/2018 | Dai | H04N 9/64 |
| 2022/0034646 A1* | 2/2022 | Park | G01N 21/4788 |

FOREIGN PATENT DOCUMENTS

| | | |
|---|---|---|
| CN | 107290846 A | 10/2017 |
| CN | 108169173 A | 6/2018 |
| CN | 108200687 A | 6/2018 |
| CN | 108205191 A | 6/2018 |
| CN | 108332684 A | 7/2018 |
| CN | 108362643 A | 8/2018 |
| CN | 109580457 A | 4/2019 |
| KR | 10-1867351 B1 | 6/2018 |

OTHER PUBLICATIONS

Kong et al., "Transmission Stereo Microscope Based on Programmable LED Array Illumination", ACTA Optica Sinica, May 2016, vol. 36, No. 5, pp. 0511005-1 to 0511005-7.

Li et al., "Efficient quantitative phase microscopy using programmable annular LED illumination", Biomedical Optics Express, Oct. 1, 2017, vol. 8, No. 10, pp. 4687-4705.

* cited by examiner

3D DIFFRACTION TOMOGRAPHY MICROSCOPY IMAGING METHOD BASED ON LED ARRAY CODED ILLUMINATION

FIELD OF THE INVENTION

The present invention belongs to optical microscopy measurement, three-dimensional refractive index imaging technology, especially a three-dimensional diffraction tomography microscopy imaging method based on LED array coded illumination.

BACKGROUND OF THE INVENTION

With the development of biomedicine, imaging analysis test equipment is an important tool to observe the structural morphology and life state of cells and biological tissues, among which microscopic imaging instruments are increasingly important as the most commonly used imaging tools in biomedical research, while the traditional optical microscope can only obtain two-dimensional distribution of the sample to be tested, and cannot give the three-dimensional spatial information of the object under test, which is difficult to meet the increasingly developed biomedical research It is difficult to meet the requirements of the growing biomedical research. Optical microlayer imaging is a technical tool that can achieve the measurement of the internal three-dimensional structure of the sample. In optical microscopic imaging, the refractive index of the cell or biological tissue, as the inherent source of contrast of the sample to be measured, contains important information parameters such as the shape, size, and volume of the cell or biological tissue, features that are crucial for the morphological detection and medical diagnosis of biological diseases. Therefore, in biological research, the study of the three-dimensional refractive index of the sample to be measured is of great importance to improve the accuracy of medical morphological detection and medical diagnosis.

In biological cells, different refractive index distributions will cause different phase delays of the incident light waves. Based on this principle, phase microscopy techniques such as phase symmetric microscopy, differential interference difference microscopy and quantitative phase microscopy have been developed. These microscopy techniques translate the different refractive index distributions within the cell into different contrasts in the acquired image, but in general, the refractive index within the cell is very weak, which requires modulation of the incident light wave to improve the resolution of the image. Zernike phase microscopy uses a phase plate with zero frequency attenuation and a 90-degree phase shift for spatial filtering, which converts the object phase structure into a planar light intensity distribution (F. Zernike, "Phase contrast, a new method for the microscopic observation of transparent objects," Physica 9(7), 686-698 (1942). The differential interference difference microscope uses a Wollaston prism to produce a difference in the optical range of two beams of light, thus translating the difference in refractive index within the sample to be measured into a change in the light and brightness of the image (G. Nomarski and A. Weill, "Application à la métallographie des méthodes interférentielles à deux ondes polarisées," Rev. Metall 2, 121-128 (1955)). But in real life, the sample is three-dimensional, the phase microscopy and differential interference difference microscopy, these techniques provide not quantitative phase changes, in order to get a high-resolution system generally uses a large numerical aperture, moreover, leads to get the three-dimensional refractive index of the sample to be measured is not accurate enough; traditional optical microscopy, such as fluorescence microscopy with fluorescent dyes, is widely biomedical researchers Traditional optical microscopes, such as fluorescence microscopes with fluorescent dyes, are widely used by biomedical researchers. However, there are many problems with dye-labeled microscopes, such as dyes that change cellular properties, difficulty in long-term measurements due to bleaching, and time-consuming staining processes. In order to observe the morphology and optical properties of intact cells without labeling, quantitative phase microscopy has been developed in recent years by tuning the reference light so that the sample beam is phase-shifted from the reference light and the refractive index difference is measured after interference. Although the three-dimensional morphology and optical properties of living cells can be obtained, the phase delay is proportional to the product of refractive index and path length, so only the average refractive index parameters of the cell are available, and the detailed three-dimensional structure inside the cell is not.

In the past few years, based on quantitative phase microscopy, many new kinds of microscopy techniques that can measure the three-dimensional refractive index distribution of biological cells have also been developed, such as digital holographic microscopy, optical scanning microscopy, tomographic microscopy, etc. Digital holographic microtomography combines digital holographic microscopy and diffraction tomography to first holographically record the digital hologram of the object to be measured at each observation angle, numerically reproduce the complex amplitude data at the full angle, and then reconstruct the three-dimensional refractive index distribution of the internal structure of the object using certain reconstruction algorithms. It has the advantages of fast imaging speed, wide beam irradiation and low optical power required, non-perturbative analysis without fluorescent markers, and high spatial resolution. Digital holographic micro-diffraction tomography has two main methods to obtain the light field distribution of objects at different angles: one is to change the illumination tilt direction while the sample remains fixed; the other is to rotate the sample while the illumination direction remains unchanged. The former device can keep the sample stationary and is suitable for living samples such as biological cells, but the recording angle is limited by the numerical aperture of the microscope objective, resulting in the problem of "conical spectrum loss". Optical scanning microscope, through the axial scanning of the sample to be measured to achieve three-dimensional refractive index quantitative imaging, axial scanning when the illumination source coherence parameter is small, the intensity map taken by the higher contrast, so the signal-to-noise ratio is higher, but the final three-dimensional spectrum of the axial resolution is lower. When the coherence parameter of the illumination source is larger, the resolution of the final reconstruction is higher, but the lining of the image is very low, resulting in a poor signal-to-noise ratio of the intensity map taken. Therefore, the development of new optical microtomography imaging techniques to achieve unperturbed, high-resolution, quantitative microscopic analysis of cells, microscopic biological tissues, and other samples is a technique urgently needed for biomedical research.

SUMMARY OF THE INVENTION

The purpose of the present invention is to provide a three-dimensional diffraction tomography microscopy imaging method based on LED array coded illumination, which realizes high-resolution and high signal-to-noise ratio three-dimensional diffraction tomography microscopy imaging of cells, micro biological tissues and other samples.

The technical solution to achieve the purpose of the present invention is: a method of 3D diffraction tomography microscopy imaging based on LED array coded illumination, in the following steps.

Step 1: Acquisition of the original intensity image, in the case of the measured thick object is in focus, and by changing the LED array code so that the shape of the illumination source is a circle with coherence parameter S1, S2 and S3, by moving the carrier table or using the electrically tunable lens to acquire three sets of intensity image stacks at different out-of-focus positions $I_{s1}^1, I_{s1}^2, \ldots I_{s1}^i, \ldots I_{s1}^N, I_{s2}^1, I_{s2}^2, \ldots, I_{s2}^i, \ldots I_{s2}^N$ and $I_{s3}^1, I_{s3}^2, \ldots, I_{s3}^i, \ldots I_{s3}^N$.

Step 2: By changing the LED array coding so that the illumination pattern is in the shape of a circle with a coherence factor S4, and then by moving the carrier or using an electrically tunable lens to capture the intensity image stack of the object to be measured at different out-of-focus positions $I_{s4}^1, I_{s4}^2, \ldots, I_{s4}^i, \ldots I_{s4}^N$.

Step 3: derivation of three-dimensional phase transfer functions for microscopic imaging systems with arbitrarily shaped illumination, extension of the three-dimensional transfer function model for tilted coherent point light sources to a three-dimensional transfer function model for partially coherent illumination and annular illumination, and obtaining three-dimensional phase transfer functions for microscopic systems under circular and annular illumination with different coherence parameters.

Step 4: three-dimensional diffraction laminar analysis quantitative refractive index deconvolution reconstruction, three-dimensional Fourier transform of the acquired four groups of intensity image stacks to obtain the three-dimensional spectrum of the four illumination cases, the four groups of three-dimensional spectrum obtained will be summed and then divided in the frequency domain by the sum of the absolute values of the four three-dimensional phase transfer functions to obtain the three-dimensional scattering potential function.

Step 5: The quantitative three-dimensional refractive index distribution of the measured object is obtained by converting the scattering potential function into the refractive index distribution by inverse Fourier transform of the three-dimensional scattering potential function.

The invention has significant advantages over the prior art: (1) LED encoded illumination is applied to 3D diffraction tomography imaging, three circular and one annular illumination patterns with different coherence parameters are obtained by changing the LED array encoding, four sets of image stacks at different out-of-focus positions are acquired by the camera, and the 3D Fourier transform of the four sets of intensity image stacks is performed to obtain the 3D spectrum under four different illumination cases. The three-dimensional spectra of the four different illumination cases are summed, and then the three-dimensional scattering potential function of the sample to be measured is obtained by dividing the sum of the absolute values of the three-dimensional phase transfer functions in the frequency domain. Finally, the inverse Fourier transform of the 3D scattering potential function is performed to convert the scattering potential function into the refractive index distribution of the sample to be measured. (2) The three-dimensional phase transfer function is re-derived so that the light pupil transfer function can be obtained under arbitrary illumination shape. The 3D transfer function model of tilted coherent point light source is extended to the 3D transfer function model under partially coherent illumination and annular illumination to obtain the 3D phase transfer function of the microscope system under circular and annular illumination with different coherence parameters. (3) Three-dimensional diffraction tomography uses the multi-frequency combination of annular illumination pupil and multiple conventional circular illumination pupils, which not only expands the system field imaging resolution by 2 times resolution, but also makes the acquired images have strong contrast and high signal-to-noise ratio, which can theoretically achieve the lateral resolution up to 200 nm and axial resolution up to 645 nm. reduces the image noise and the image resolution reaches the incoherent diffraction limit.

The present invention is described in further detail below in conjunction with the accompanying drawings.

DESCRIPTION OF THE PREFERRED EMBODIMENT

The present invention is based on a three-dimensional diffraction tomography microscopy imaging method with LED array encoded illumination in the following process.

Figure 1:
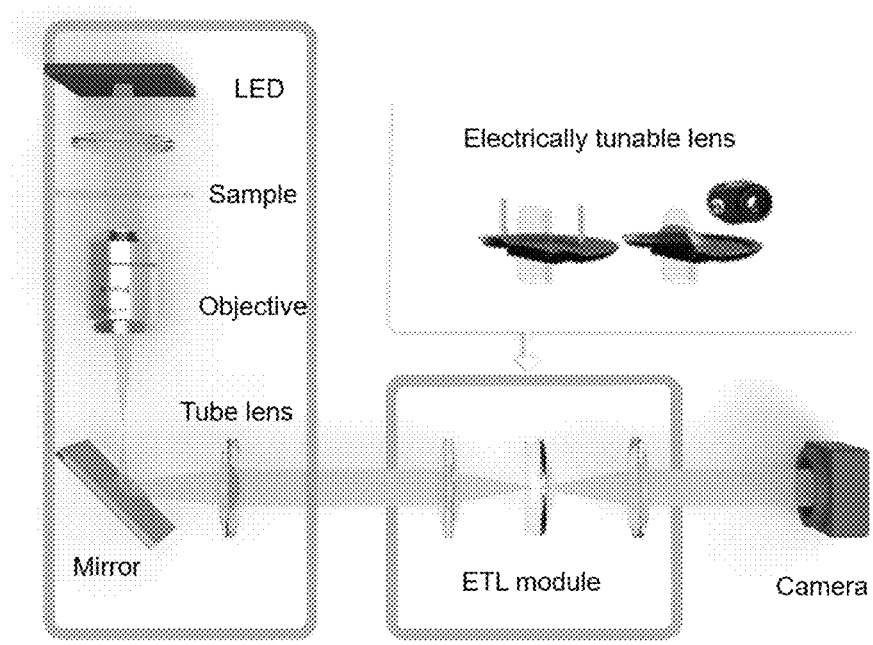
FIG. 1 is a schematic diagram of the three-dimensional diffraction tomography microscopy imaging system of the present invention.

Step 1, build a three-dimensional diffraction tomography microscopy imaging system: combined with FIG. 1, the microscopy imaging system includes an LED array coding illumination source, a microscope objective, a barrel mirror, a plane mirror, electrically tunable lens control module, a camera and a computer, where the computer is connected to the electrically tunable lens control module and the camera via signal lines, respectively. The lighting source uses LED array coding illumination, and the LED array coding can be changed to achieve different patterns of illumination. Image acquisition is performed by CMOS camera, and the acquired image is passed to the computer for calculation and processing. The axial scan of the sample to be measured is driven by electrically tunable lens control module to acquire the image pile, and the axial scan step of the electrically tunable lens control module is 0.1 µm. four groups of plots are measured under different LED array coded illumination, each group includes 100 images, each image has a resolution of 400×400, and three circular illumination. x, y, and z spatial sampling rates are 0.065 µm, 0.065 µm and 0.1 µm. Based on the circular and annular illumination conditions with different coherence parameters, the acquisition image stacking time is 15 ms, the data processing time is 10 ms, and the camera exposure time is 30 ms. The computer is also equipped with MATLAB, and after the acquisition of the images, the processing of the images is all realized by writing code using MATLAB, which is used for the 3D The computer is also equipped with MATLAB, after the acquisition of the images, the processing of the images is realized by using the code written in MATLAB.

Step 2, acquisition of the original intensity image: in the case of the thick object sample to be measured as the focus state, by changing the LED array coding so that the illumination source shape for the coherence parameter S1, S2 and S3 the circular shape, by moving the carrier table or using the electrically tunable lens to acquire three sets of intensity image stacks at different out-of-focus positions $I_{s1}^1$, $I_{s2}^2, \ldots, I_{s1}^i, \ldots I_{s1}^N, I_{s2}^1, I_{s2}^2, \ldots, I_{s2}^i, \ldots I_{s2}^N$ and $I_{s3}^1$, $I_{s2}^2, \ldots, I_{s3}^i, \ldots I_{s3}^N$. The intensity image stacks of the object to be measured at different out-of-focus positions are acquired by moving the carrier or using the electrically tunable lens $I_{s4}^1, I_{s2}^2, \ldots, I_{s4}^i, \ldots I_{s4}^N$ S4 four different image stacks based on the LED array coding illumination can be obtained by the CMOS camera, i.e., the circular illumination scheme is introduced into the conventional circular shape by LED array coding illumination. The bright-field microscope was used to capture a series of light intensity image stacks along the axial direction under the circular shape illumination pattern $I_{s4}^1, I_{s2}^2, \ldots, I_{s4}^i, \ldots I_{s4}^N$.

Figure 2:
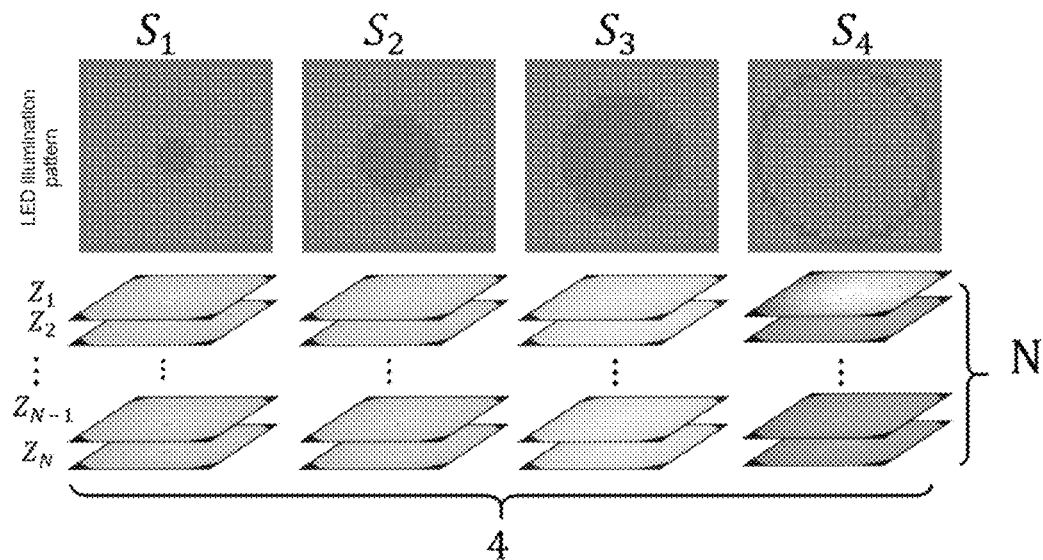
FIG. 2 is a schematic diagram of the four image stacks of the present invention acquired under four different LED array illumination sources.

FIG. 2 shows the axial image stacks under the illumination of four different LED array codes, respectively. By changing the LED array coding so that the circular illumination pattern from small to large, the fourth group will change the illumination pattern to circular illumination pattern, and then under each lighting condition, the intensity image stack of the object to be measured under different out-of-focus positions is collected by the electrically tunable lens. The first row is the LED array coded illumination pattern, the second row is the image intensity map acquired under the axial Z1 position, the second row is the image stack map acquired under the axial Z2 position, and so on, and the intensity image stack of the object to be measured under different out-of-focus positions in the axial direction is acquired by changing the electrically tunable lens. For each LED array coded illumination pattern illumination pattern, 100 intensity maps with a resolution of 400×400 are acquired respectively.

In step 3, the three-dimensional phase transfer function of the microscopic imaging system with arbitrarily shaped pupil illumination is derived: from the three-dimensional transfer function model of tilted coherent point light source to the three-dimensional transfer function model of partially coherent illumination and annular illumination, the three-dimensional phase transfer function of the microscopic system under circular and annular illumination with different coherence parameters is obtained. The absorbance $n_a(r)$ and refractive index $n_P(r)$ of the three-dimensional object correspond to the imaginary and real parts of the complex refractive index n(r), respectively, and the relationship between the n(r) complex refractive index of the object $n_0(r)$ and the refractive index of the enclosing medium can be expressed as the three-dimensional scattering potential $$V(r) = k_0^2[n^2(r) - n_m^2].$$

where r is the three-dimensional spatial variable, $k_0$ is the number of waves in the vacuum corresponding to the wavelength, and $n_m$ is the refractive index of the medium in which the object is located.

In a conventional transmission bright-field microscopy system, the intensity image measured for a three-dimensional object I(r) can be expressed as $$I(r) = B + P(r) \otimes H_P(r) + A(r) \otimes H_A(r)$$

where B is the captured transmitted light component, A(r) and P(r) are the imaginary and real parts of the object's 3D scattering potential, respectively. $H_A(r)$ and $H_P(r)$ are the point spread functions of the imaging system for the absorbed and phase parts of the object, respectively.

A three-dimensional Fourier transform of the above equation yields the three-dimensional Fourier spectrum of the captured intensity map;

$$\tilde{I}(\rho) = B\delta(\rho) + \tilde{P}(\rho)T_P(\rho) + \tilde{A}(\rho)T_A(\rho)$$

where $B\delta(\rho)$ is the zero frequency component of the corresponding intensity image. $\tilde{P}(\rho)$ and $T_P(\rho)$ are the three-dimensional transfer functions of the spectrum and phase of the phase component of the scattering potential, respectively, while $\tilde{A}(\rho)$ and $T_A(\rho)$ are the three-dimensional transfer functions of the frequency component and absorption of the absorption component of the scattering potential, respectively. the three-dimensional transfer function corresponding to the phase component is $$\tilde{T}_P(u, v, w) = \frac{j\lambda}{4\pi} \int\int \tilde{P}\left(u' + \frac{1}{2}u, v' + \frac{1}{2}v\right)\tilde{P}^*\left(u' - \frac{1}{2}u, v' - \frac{1}{2}v\right) \times$$

$$\left[\tilde{S}\left(u' + \frac{1}{2}u, v' + \frac{1}{2}v\right) - \tilde{S}\left(u' - \frac{1}{2}u, v' - \frac{1}{2}v\right)\right] \times$$

$$\delta\left[w + \sqrt{\lambda^{-2} - \left(u - \frac{1}{2}u\right)^2 - \left(v - \frac{1}{2}v\right)^2} - \sqrt{\lambda^{-2} - \left(u' + \frac{1}{2}u\right)^2 - \left(v' + \frac{1}{2}v\right)^2}\right] du dv$$

where $\rho = (u, v, w)$, $\lambda$ is the corresponding illumination source wavelength, $\tilde{S}(u,v)$ is the light source distribution function, $\tilde{P}(u,v)$ and $\tilde{P}^*(u,v)$ is a pair of conjugate light pupil function defined by the microscope objective, whose absolute value can be expressed as $$|P(u)| = \begin{cases} 1, & \text{if } u \leq \rho_P \\ 0, & \text{if } u > \rho_P \end{cases}$$

where $\rho_P$ is the normalized cutoff frequency of the pupil of the microscope objective.

For a coherent point source at any point on the source plane, that is $\tilde{S}(u,v) = \delta(u - \rho_s, v)$. Substituting this light source function into the above equation, the corresponding three-dimensional phase transfer function for this light source is obtained as $$\tilde{T}_p(u, v, w) =$$
$$\frac{j\lambda}{4\pi}\tilde{P}^*(\rho_s - u, -v)\delta\left[w - \sqrt{\lambda^{-2} - \rho_s^2} + \sqrt{\lambda^{-2} - (\rho_s - u)^2 - v^2}\right] -$$
$$\frac{j\lambda}{4\pi}\tilde{P}(\rho_s + u, v)\delta\left[w + \sqrt{\lambda^{-2} + \rho_s^2} - \sqrt{\lambda^{-2} - (\rho_s + u)^2 - v^2}\right]$$

The above three-dimensional transfer function of can be divided into $$\delta\left[w - \sqrt{\lambda^{-2} - \rho_s^2} + \sqrt{\lambda^{-2} - (\rho_s - u)^2 - v^2}\right]$$

and $$\delta\left[w + \sqrt{\lambda^{-2} + \rho_s^2} - \sqrt{\lambda^{-2} - (\rho_s + u)^2 - v^2}\right],$$

that is, the two spherical shells moved by the illuminated light source in three-dimensional space $$\left(w + \sqrt{\lambda^{-2} + \rho_s^2}\right)^2 + (\rho_s + u)^2 + v^2 = \lambda^{-2}$$

and $$\left(w - \sqrt{\lambda^{-2} - \rho_s^2}\right)^2 + (\rho_s - u)^2 + v^2 = \lambda^{-2},$$

that is, the definition function of the Ewald spherical shell.
When the light source is a traditional circular pattern i.e.

$$S(u) = \begin{cases} 1, & \text{if } u \leq \rho_s \\ 0, & \text{if } u > \rho s \end{cases}$$

S(u) Substituting the expression for the light source into the three-dimensional phase transfer function, the corresponding three-dimensional phase transfer function for a partially coherent illuminated circular light source with different coherence factors $\rho_S$ can be obtained.

When the light source is an annular light source can be defined as $$S(u) = \sum_{i=0}^{N}\delta(u_i), |u_i| \approx |\rho_p|$$

The form of the transfer function under annular illumination is obtained by substituting the three-dimensional phase transfer function. By extending the 3D transfer function model from the tilted coherent point source to the circular partially coherent illumination and annular illumination models, the 3D phase transfer function of the microscope system under circular and annular illumination with different coherence parameters is obtained.

Figure 3:
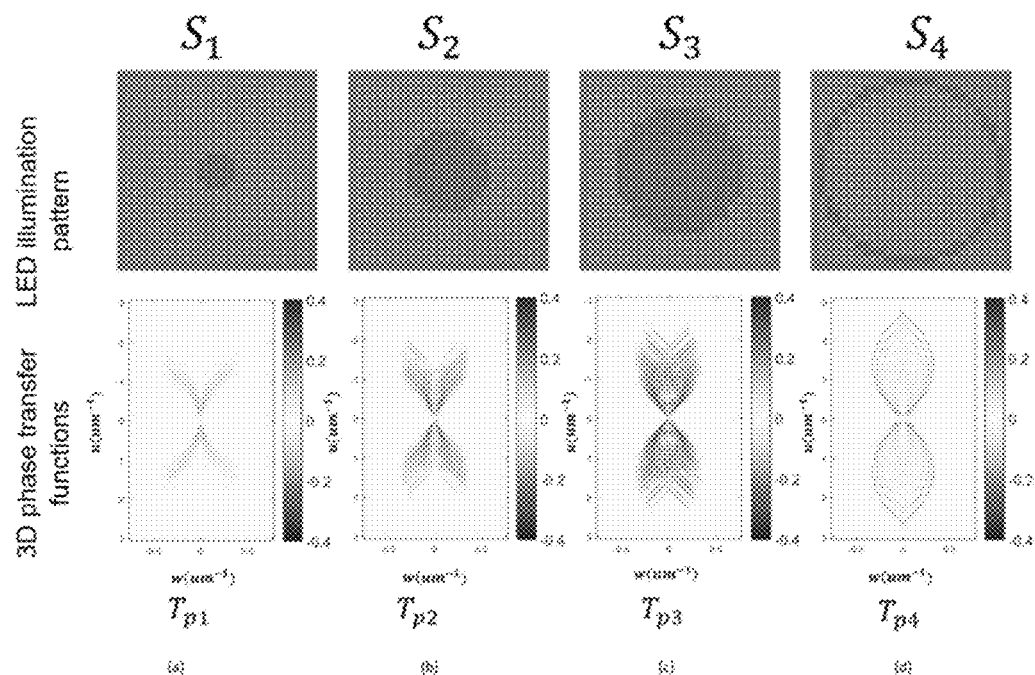
FIG. 3 is a two-dimensional schematic diagram of the corresponding three-dimensional transfer functions under four different LED array lighting sources of the present invention.

Combined with FIG. 3 is a two-dimensional schematic of the three-dimensional phase transfer function in the u-w plane based on different LED array coded illumination. From left to right the circular illumination pattern under LED array coded illumination conditions increases from small to large, and the last group is circular illumination. As seen in the first three sets of result plots, the high-frequency information of the image in its three-dimensional phase transfer function is compensated as the coherence parameter increases under circular illumination conditions. However, due to the increase in the numerical aperture, the high-frequency information is compensated while the low-frequency information is weakened. Therefore, the results in Figure (d) use circular illumination to achieve the effect of high-frequency signal compensation and low-frequency signal enhancement, which fully illustrates that the three-dimensional phase transfer function can be accurately derived based on circular illumination, proving the feasibility and accuracy of this circular illumination method.

Step 4, three-dimensional diffraction laminar quantitative refractive index deconvolution reconstruction: the acquired four groups of intensity image stacks are subjected to three-dimensional Fourier transform to obtain the three-dimensional spectra under four illumination cases. The obtained four sets of 3D spectra are summed and then divided by the sum of the absolute values of the four 3D phase transfer functions in the frequency domain to obtain the 3D scattering potential function.

The Fourier transform is performed $I_{s1}(r)$ on the intensity stacks of the circular light source with coherence parameters of S1. $I_{s1}(r)$, $I_{s2}(r)$, $I_{s3}(r)$ and $I_{s4}(r)$, and the Fourier spectra of the intensity maps are obtained as $\tilde{I}_{s1}(\zeta)$, $\tilde{I}_{s2}(\zeta)$, $\tilde{I}_{s3}(\zeta)$ and $\tilde{I}_{s4}(\zeta)$. Then the intensity stacks of the circular light source with coherence parameters of S1, S2, S3 and S4 are transformed $I_{s4}(r)$ to their Fourier domain. The sum of the Fourier spectra of the four intensity stacks obtained is divided by the sum of the $T_{P4}$ absolute values of the four 3D phase transfer functions $T_{P1}$, $T_{P2}$, $T_{P3}$ and $T_{P4}$. The sum of the four intensity stack Fourier spectra is $$\tilde{I}(\zeta)=\tilde{I}_{s1}(\zeta)+\tilde{I}_{s2}(\zeta)+\tilde{I}_{s3}(\zeta)+\tilde{I}_{s4}(\zeta)$$

where $\tilde{I}_{s1}(\zeta)$, $\tilde{I}_{s2}(\zeta)$, $\tilde{I}_{s3}(\zeta)$ and $\tilde{I}_{s4}(\zeta)$ are the Fourier spectra of intensity maps obtained by Fourier transforming the intensity stacks captured under different illuminated light sources with coherence parameters of S1, S2, S3, and S4 respectively.

The sum of the absolute values of the four three-dimensional transfer functions is $$T_P(\zeta)=|T_{P1}(\zeta)|+|T_{P2}(\zeta)|+|T_{P3}(\zeta)|+|T_{P4}(\zeta)|$$

where $T_{P1}(\zeta)$, $T_{P2}(\zeta)$, $T_{P3}(\zeta)$ and $T_{P4}(\zeta)$ correspond to four different illumination coherence parameters under the three-dimensional phase transfer function. The sum of the four intensity Fourier spectra is divided by the sum of the corresponding four three-dimensional phase transfer functions to obtain the Fourier spectrum of the three-dimensional scattering potential function of the measured object.

Step 5: Quantitative three-dimensional refractive index distribution of the measured object. The inverse Fourier transform is performed on the three-dimensional scattering potential function of the object under test, and the scattering potential function is converted into the refractive index distribution to obtain the quantitative three-dimensional refractive index distribution of the object under test.

$$P(r) = F^{-1}\left(\frac{\tilde{I}_{s1}(\zeta) + \tilde{I}_{s2}(\zeta) + \tilde{I}_{s3}(\zeta) + \tilde{I}_{s4}(\zeta)}{|T_{P1}(\zeta)| + |T_{P2}(\zeta)| + |T_{P3}(\zeta)| + |T_{P4}(\zeta)|}\right)$$

By P (r) using the scattering potential formula, the quantitative three-dimensional refractive index distribution of the object under test is obtained.

Figure 4:
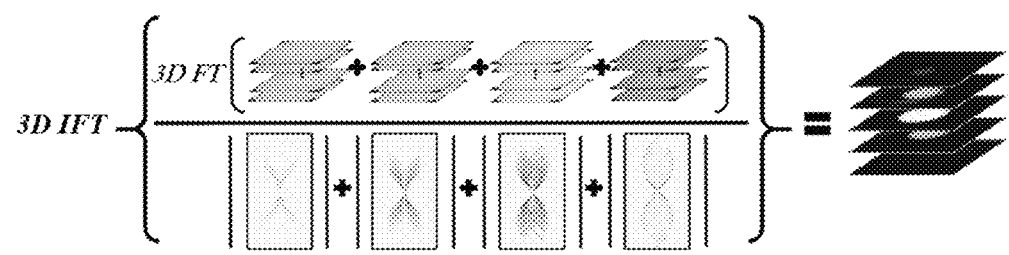
FIG. 4 is a flow chart of the 3D diffraction tomography quantitative refractive index deconvolution reconstruction method of the present invention.

Combined with FIG. 4 is a block diagram representation of the three-dimensional diffraction tomography quantitative refractive index deconvolution reconstruction method. The numerator in the dashed box represents the sum of the image stacks acquired under four different LED array coded illumination for Fourier transform, and the denominator represents the sum of the absolute values of the corresponding three-dimensional phase transfer functions, and the two are divided to obtain the Fourier spectrum of the three-dimensional scattering potential function. The three-dimensional inverse Fourier transform of the three-dimensional scattering potential function can be used to obtain the quantitative three-dimensional refractive index distribution of the measured object.

Figure 5:
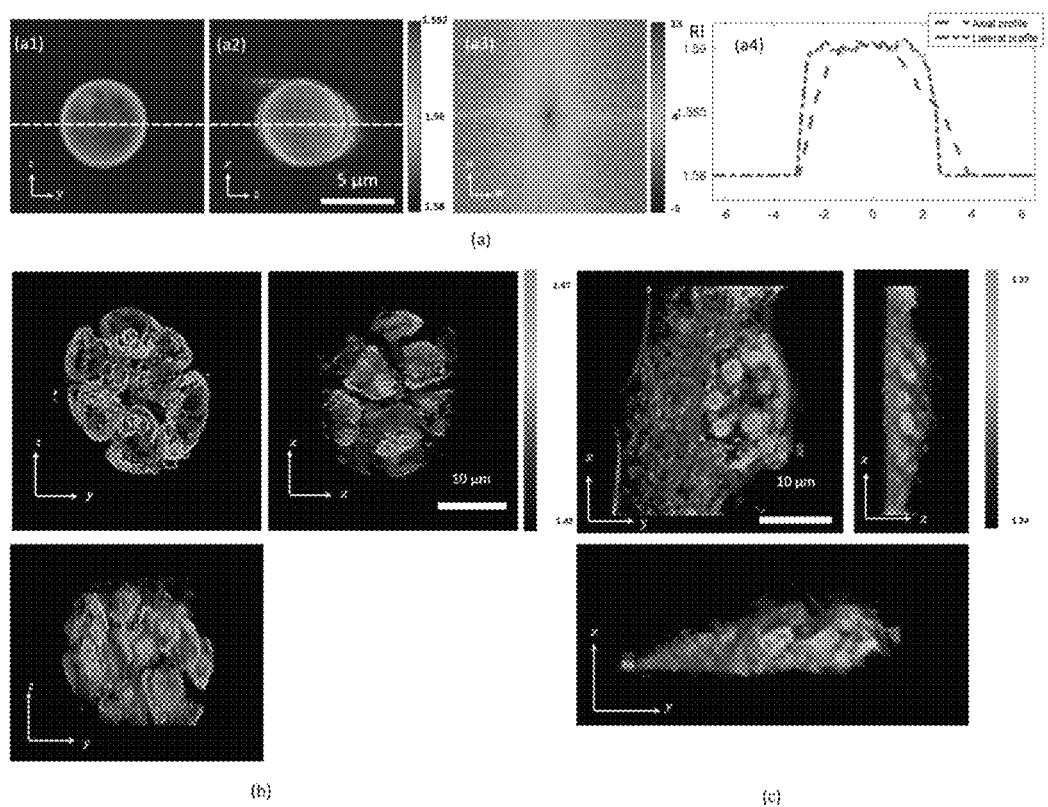
FIG. 5 is a graph of the 3D imaging results of the present invention on micro-polystyrene beads, unstained Pandorina morum and Hela cells.

FIG. 5 shows the 3D diffraction tomography microscopy imaging results based on LED array encoded illumination of micro-polystyrene beads, unstained solid spherical algae and Hera cells respectively. Fig. (a) shows the quantitative 3D refractive index distribution of 6 μm diameter micro-polystyrene beads, where Fig. (a1) and Fig. (a2) are schematic 3D slices in the X-Y plane and Y-Z plane, respectively, for the micro-polystyrene beads; Fig. (a3) is a schematic 3D Fourier spectrum of the final reconstruction; Fig. (a4) is the axial and transverse 3D refractive index profiles of the micro-polystyrene beads. Figure (b) is a schematic diagram of the distribution of 3D diffraction laminarization in the X-Y plane, X-Z plane and Z-Y plane for unstained real algae, a green algae composed of 8, 16 or 32 cells, with internal cells forming ellipsoids with distinct anterior-posterior polarity, which also makes real algae an ideal object for 3D diffraction deconvolution, respectively. Figure (c) is a schematic diagram of the 3D diffraction lamination of Pandorina morum. cells in the X-Y plane, X-Z plane and Z-Y plane, respectively, and as shown in FIG. 5, we can clearly see how the individual cells inside the micro-polystyrene beads, solid spherical algae cells are distributed and the morphology of the cells at each angle, further confirming the This further confirms the feasibility and accuracy of this multi-frequency synthesis-based 3D deconvolution of diffraction tomography.

The invention claimed is:

1. A method of three-dimensional diffraction tomography microscopy imaging by using a microscope imaging system based on LED array coded illumination, comprising the steps of:

step 1: acquiring three sets of intensity image stacks of the object to be measured at different out-of-focus positions $I_{s1}^1, I_{s1}^2, \ldots I_{s1}^i, \ldots I_{s1}^N, I_{s2}^1, I_{s2}^2, \ldots I_{s2}^i, \ldots I_{s2}^N$ and $I_{s3}^1, I_{s3}^2, \ldots I_{s3}^i, \ldots I_{s3}^N$ by using an electrically tunable lens, wherein a shape of an illumination source is a circle with coherence factors S1, S2 and S3 based on the LED array coded illumination;

step 2: capturing a set of intensity image stack of the object to be measured at different out-of-focus positions $I_{s4}^1, I_{s4}^2, \ldots I_{s4}^i, \ldots I_{s4}^N$ by changing LED array coding so that an illumination pattern is in a shape of a circle with a coherence factor S4, and then by using electrically tunable lens;

step 3: deriving a three-dimensional phase transfer function of the microscopic imaging system with arbitrary shape illumination by extending a three-dimensional transfer function model of tilted coherent point light source to a three-dimensional transfer function model of partially coherent illumination and annular illumination, and obtaining the three-dimensional phase transfer function of the microscopic imaging system under circular and annular illumination with different coherence parameters;

step 4: reconstructing a 3D diffraction tomography quantitative refractive index deconvolution reconstruction by subjecting three sets of intensity image stacks of the object to be measured at different out-of-focus positions $I_{s1}^1, I_{s1}^2, \ldots I_{s1}^i, \ldots I_{s1}^N, I_{s2}^1, I_{s2}^2, \ldots I_{s2}^i, \ldots I_{s2}^N$ and $I_{s3}^1, I_{s3}^2, \ldots I_{s3}^i, \ldots I_{s3}^N$ obtained in the step 1 and the set of intensity image stack of the object to be measured at different out-of-focus positions $I_{s4}^1, I_{s4}^2, \ldots I_{s4}^i, \ldots I_{s4}^N$ obtained in the step 2 to three-dimensional Fourier transform, obtaining a 3D spectrum of four illumination cases, summing four groups of 3D spectra dividing a sum of the four groups of 3D spectra in the frequency domain by a sum of absolute values of four 3D phase transfer functions to obtain a 3D scattering potential function; and step 5: obtaining a quantitative three-dimensional refractive index distribution of the measured object by performing an inverse Fourier transform of the 3D scattering potential function, and converting the scattering potential function into the quantitative three-dimensional refractive index distribution.

2. The method according to claim 1, wherein in step 2: the illumination pattern is introduced into a conventional circular brightfield microscope by the LED array encoded illumination, and the set of intensity image stack along an axial direction under the illumination pattern in the shape of the circle are taken $I_{s4}^1, I_{s4}^2, \ldots I_{s4}^i, \ldots I_{s4}^N$.

3. The method according to claim 2, wherein the step 2 further comprises the step of changing the LED array coding so that the illumination pattern is changed from small to large, changing the illumination pattern to circular illumination pattern, and then in each lighting condition, collecting an intensity of the object to be measure through the electrically tunable lens in different out-of-focus positions.

4. The method according to claim 1, wherein in the step 3, the three-dimensional transfer function model of tilted coherent point light source is extended to the three-dimensional transfer function model of partially coherent illumination and annular illumination by using the following algorithm:

under situations of tilted coherent point light source and circular pupil function of microscope objective, where a distribution of the tilted coherent point light source is a delta function $\tilde{S}(u,v) = \delta(u-\rho_s, v)$ and an absolute value of objective pupil function is expressed as $$|P(u)| = \begin{cases} 1, & \text{if } u \leq \rho_P \\ 0, & \text{if } u > \rho_P \end{cases}$$

with a definition of coherence factors of illumination source $\rho_s$, lateral spatial frequency coordinates (u,v), and normalized cutoff frequency of the pupil of the microscope objective $\rho_p$, and a corresponding three-dimensional phase transfer function $\tilde{T}_p$ for the source is obtained by substituting the delta function $\tilde{S}$ and objection pupil function $\tilde{P}$;

$$\tilde{T}_p(u, v, w) =$$

$$\frac{j\lambda}{4\pi}\tilde{P}^*(\rho_s - u, -v)\delta\left[w - \sqrt{\lambda^{-2} - \rho_s^2} + \sqrt{\lambda^{-2} - (\rho_s - u)^2 - v^2}\right] -$$

$$\frac{j\lambda}{4\pi}\tilde{P}(\rho_s + u, v)\delta\left[w + \sqrt{\lambda^{-2} + \rho_s^2} - \sqrt{\lambda^{-2} - (\rho_s + u)^2 - v^2}\right],$$

where ρ is a corresponding illumination light source wavelength, and w is an axial spatial frequency coordinates, and δ is a delta function with a definition of an Ewald spherical shell, and
wherein for cases of partially coherent illumination and annular illumination source S(u), the light source is a circular pattern and is defined as $$S(u) = \begin{cases} 1, & \text{if } u \leq \rho_s \\ 0, & \text{if } u > \rho s \end{cases}$$

and annular light source is expressed as $$S(u) = \sum_{i=0}^{N} \delta(u_i), |u_i| \approx |\rho_p|,$$

respectively, by extending the three-dimensional transfer function model of the tilted coherent point source to the circular partially coherent illumination and annular illumination models, the three-dimensional phase transfer function of the microscope system under circular and annular illumination with different coherence parameters is obtained then.

5. The method according to claim 1, wherein the step 5 further comprises the step of performing the inverse Fourier transform of the 3D scattering potential function by using a scattering potential formula as follows:

$$P(r) = F^{-1}\left(\frac{\tilde{I}_{s1}(\zeta) + \tilde{I}_{s2}(\zeta) + \tilde{I}_{s3}(\zeta) + \tilde{I}_{s4}(\zeta)}{|T_{P1}(\zeta)| + |T_{P2}(\zeta)| + |T_{P3}(\zeta)| + |T_{P4}(\zeta)|}\right),$$

where $\tilde{I}_{s1}(\zeta)$, $\tilde{I}_{s2}(\zeta)$, $\tilde{I}_{s3}(\zeta)$ and $\tilde{I}_{s4}(\zeta)$ are the Fourier spectra of intensity maps obtained by Fourier transforming the intensity stacks captured under different illuminated light sources distribution respectively, and $Y_{p1}$, $T_{p2}$, $T_{p3}$, and $T_{p4}$ (ζ) are four corresponding three-dimensional phase transfer functions under different illumination sources respectively.

* * * * *